March 30, 1954
A. T. HUTCHINSON
2,673,493
INTERNAL GEAR CUTTING MACHINE AND THE LIKE
Filed March 25, 1949
5 Sheets-Sheet 1
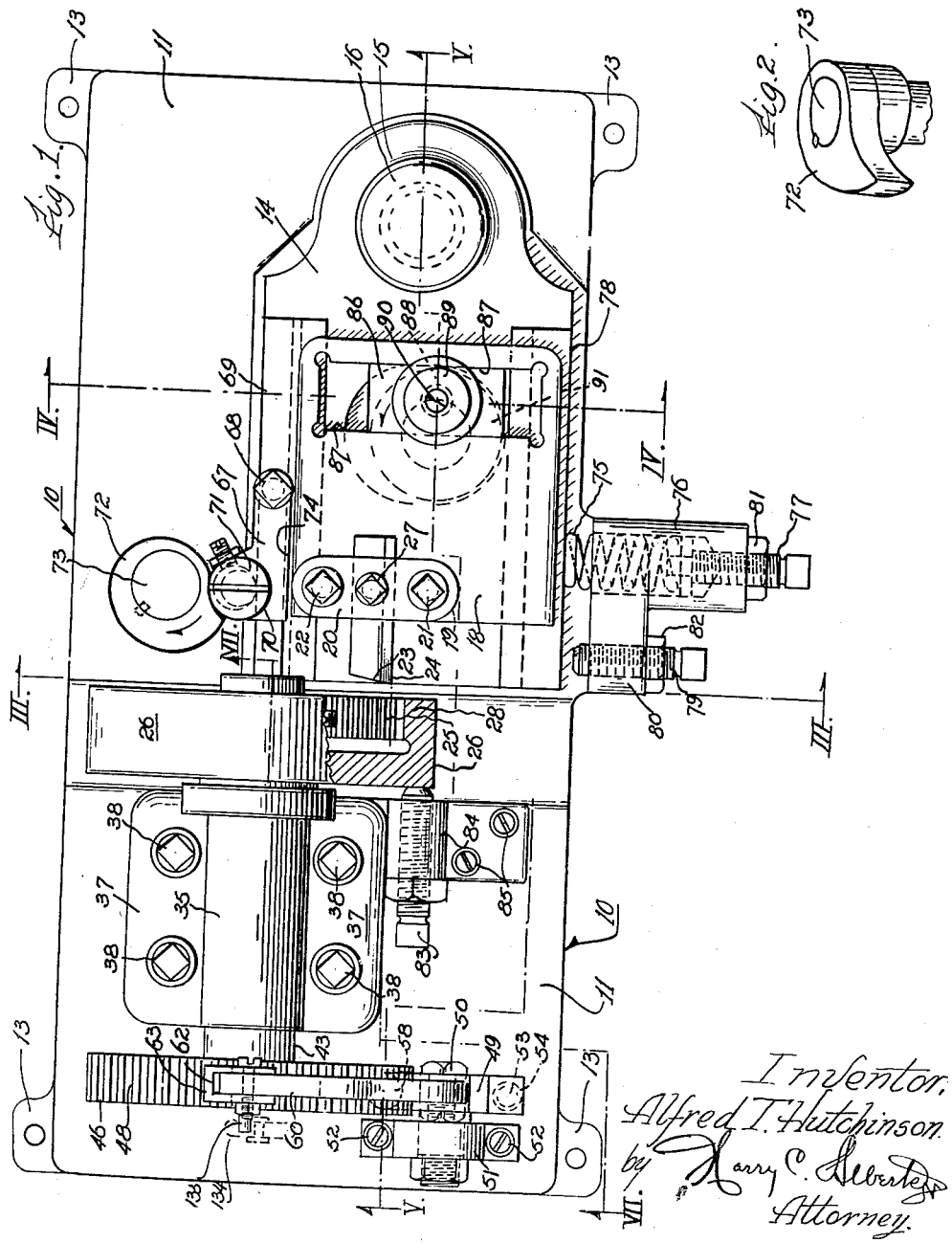
Inventor,
Alfred T. Hutchinson.
by Harry C. Silvester
Attorney.

March 30, 1954   A. T. HUTCHINSON   2,673,493
INTERNAL GEAR CUTTING MACHINE AND THE LIKE
Filed March 25, 1949

Inventor:
Alfred T. Hutchinson
by Harry C. Beverley
Attorney.

March 30, 1954

A. T. HUTCHINSON 2,673,493

INTERNAL GEAR CUTTING MACHINE AND THE LIKE

Filed March 25, 1949

Inventor.
Alfred T. Hutchinson
by Harry C. Levitz
Attorney.

March 30, 1954  A. T. HUTCHINSON  2,673,493
INTERNAL GEAR CUTTING MACHINE AND THE LIKE
Filed March 25, 1949  5 Sheets-Sheet 5
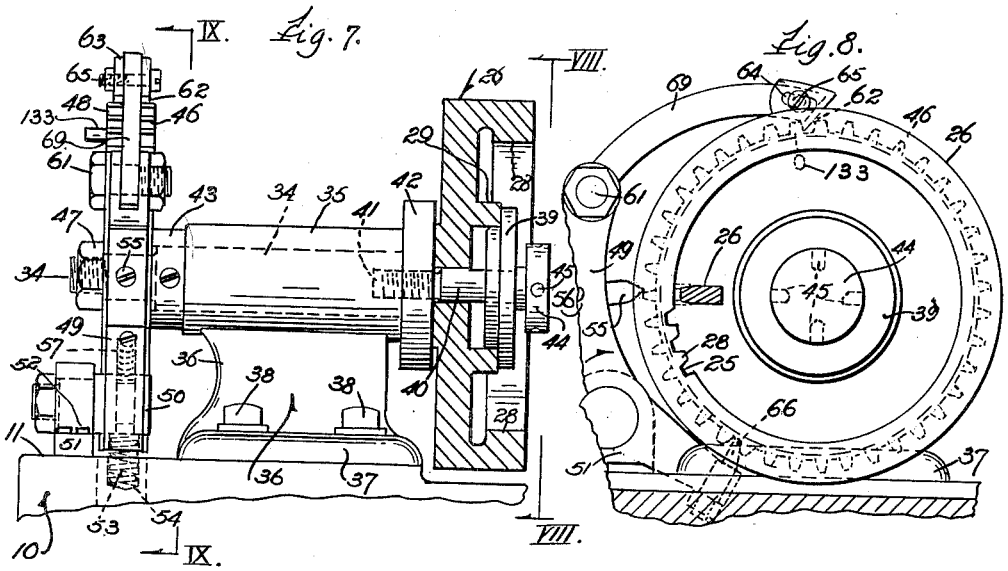
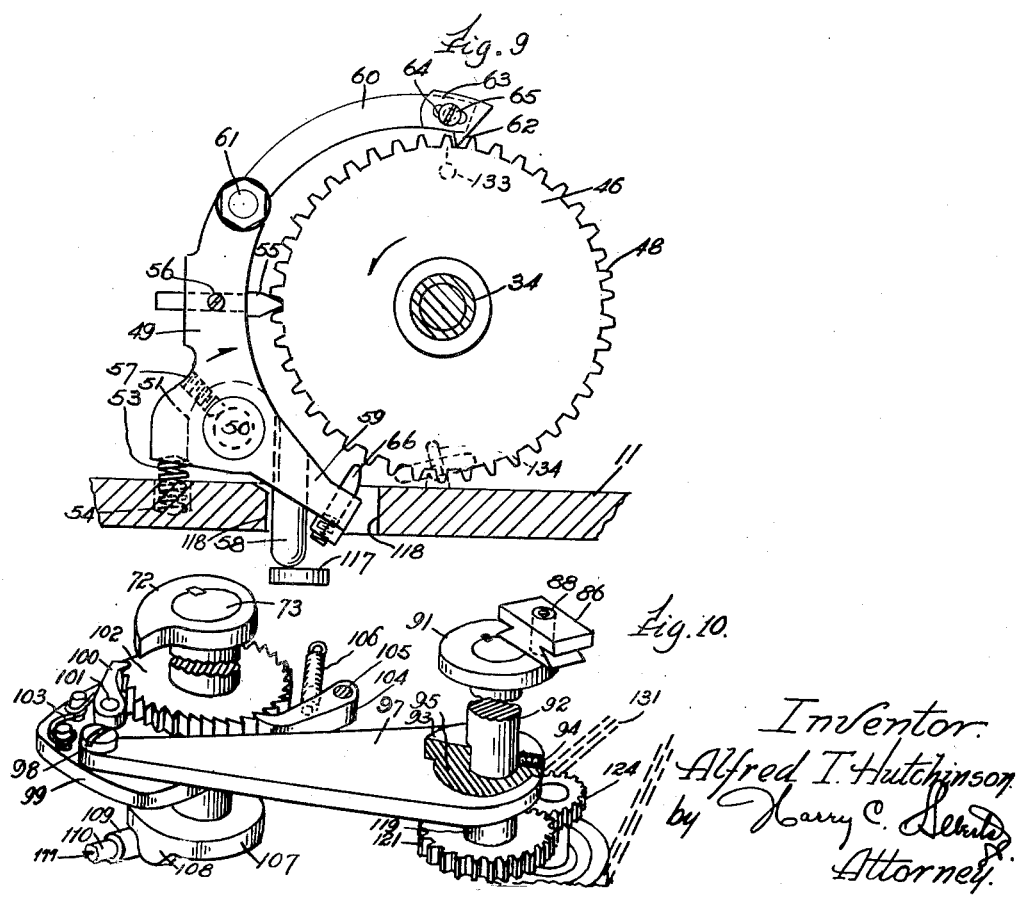
Inventor:
Alfred T. Hutchinson
by Harry C. [signature]
Attorney Patented Mar. 30, 1954

2,673,493

UNITED STATES PATENT OFFICE 2,673,493

INTERNAL GEAR CUTTING MACHINE AND THE LIKE

Alfred T. Hutchinson, Hammond, Ind.

Application March 25, 1949, Serial No. 83,412

11 Claims. (Cl. 90—10)

This invention relates to gear cutting machines, and more particularly to gear teeth cutters of the shaper machine type for the production of internal ring gears, although it and certain features thereof may be employed with equal advantage for other purposes.

It contemplates more especially the provision of an internal ring gear shaping machine which can cut teeth within restricted space such as presented by internal ring gears having protruding hubs or hub flanges disposed parallel to the peripheral flange wherein the gear teeth are to be cut or formed.

Innumerable types of gear teeth cutters have heretofore been proposed; however, very little attention or consideration has been given to the cutting of internal gears wherein the space is too restricted for known types of cutters which are usually large and usable only in the cutting of teeth on comparatively large circumferences.

Then, too, internal gears are cut before attachment of a hub thereto or the internal gear ring is later attached to a plate for mounting. Where separately attached hubs are not desirable or too costly for use in any particular assembly, the cutting of internal gear teeth is troublesome and usually a costly operation. The teachings of the present invention are especially useful in such situations owing to the ability to effect tooth cuts in highly restricted spaces so that protruding hubs on even small internal gears do not present obstructions to cutting operations and movements.

One object of the present invention is to provide an internal gear cutter of improved construction which will cut teeth in a series of successive cuts in highly restricted areas.

Another object of the present invention is to adapt a shaper machine tool cutting principle of operation to the task of cutting internal gear blanks presenting highly restricted spaces for gear cutting operations.

Still another object is to provide a simple, flexible, and effective gear cutter tool which shapes teeth in a series of successive reciprocative cutting movements.

A further object is to provide a simple and comparatively inexpensive gear cutter of the reciprocative type which successively shapes teeth and repeats the operation around the full circumference of a blank.

A still further object is to provide a simple, inexpensive, and highly accurate gear cutter of the reciprocative type which shapes the individual teeth in a predetermined number of reciprocative cuts and then repeats the cycle of operation to provide uniformly spaced teeth around an external or internal circumference of any selected size.

Still a further object is to provide an improved gear cutter machine of the reciprocative type which automatically shapes individual gear teeth in a series of successive cuts, then intermittently spaces the blank for cutting adjacent teeth, and terminates the operation when the entire circumference has been provided with uniformly spaced corresponding teeth to form an internal or external gear.

Other objects and advantages will appear from the following description of an illustrated embodiment of the present invention.

In the drawings:

Figure 1 is a plan view of a device embodying features of the present invention.

Figure 2 is a perspective view of a transversely acting carriage displacing and spacing cam shown in assembled position in Figure 1.

Figure 7 is a sectional view in elevation taken substantially along broken line VII—VII of Figure 1.

Figure 8 is a fragmentary view in elevation taken substantially along line VIII—VIII of Figure 7 with the cutter shown in section.

Figure 9 is a fragmentary view in elevation taken substantially along line IX—IX of Figure 7.

Figure 10 is a perspective view of the operating instrumentalities mounted beneath the frame bed for synchronizing the positioning and movement of the cutter in relation to the gear blank.

The structure selected for illustration is not intended to serve as a limitation upon the scope or teachings of the invention, but is merely illustrative thereof. There may be considerable variations and adaptations of all or part of the teachings depending upon the dictates of commercial practice.

Figure 4:
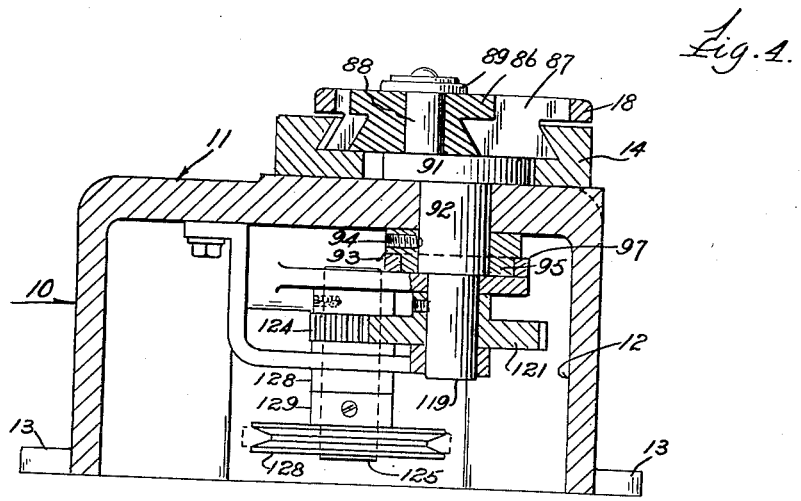
Figure 4 is a sectional view in elevation taken substantially along line IV—IV of Figure 1.

The illustrated embodiment comprises a suitable frame 10 cast or otherwise shaped to present an upraised horizontal bed 11 which presents a chambered interior 12 (Figures 1 and 4) for supporting and confining the operating instrumentalities to be hereinafter described. The frame 10 has horizontal perforated corner flanges 13 (Figure 1) to enable the anchoring thereof to a suitable support such as a table top or the like so that the bed 11 will be at the proper height for convenience of the attendant.

The frame bed 11 supports a substantially rectangular ram guide 14 which has an upraised bored boss 15 at one end (Figure 5) to receive a bearing pin 16 that is anchored to the underside of the bed 11 by a complemental threaded fastener 17. This permits the ram guide 14 to be pivotally displaced transversely of the bed 11 by instrumentalities to be hereinafter described. The transverse step-by-step displacement of the ram guide 14 carries with it a ram 18 having an upraised boss 19 that is equipped with a cutting tool holder clamp 20. The tool holder clamp 20 is adjustably connected to boss 19 by spaced threaded fasteners 21—22 to tightly embrace a tool steel cutter 23 that preferably has one edge 24 thereof shaped to correspond with cross-sectional shape of the spaces between teeth 25 (Figure 1) in an internal gear blank 26.

A set screw 27 extends through the tool holder clamp 20 to engage the cutter tool 23 and assist in retaining it against any possible movement or vibration in relation to its reciprocation in cutting teeth 25 around the internal ring 28 of the gear blank 26 (Figure 7) that has an internal hub 29 formed integral in axial concentric spaced relation with the internal ring 28. As shown, the ram 18 is provided with downwardly divergent guides 30—31 which are complemental to correspondingly sized and shaped guideways 32—33, respectively, provided in the ram guide 14. Consequently, reciprocative movement of the ram 18 will insure corresponding reciprocation of the tool cutter 23 to cut the teeth 25 in a series of successive cuts for each tooth as the ram 18 is intermittently positioned in a direction transverse to its reciprocation.

The internal gear blank 26 is held stationary during the reciprocation of the cutter tool 23 by detachable association with a shaft 34 (Figure 7) that is journalled in an elongated bearing 35 comprising part of a bearing bracket 36 which terminates in a flanged base 37. The flanged base 37 is bolted to the frame bed 11 by means of threaded fasteners 38, in this instance four, that serve to retain the bearing bracket 36 as a fixed tail stock that confronts the reciprocative cutter 23 through the medium of supporting the gear blank 26 in the path thereof. To this end, a peripherally stepped collar 39 engages the blank hub 29 to provide an axial screw shank 40 in engagement with a correspondingly threaded axial bore 41 provided in the tail stock shaft 34 that carries spacer collars 42—43 adjacent both ends of the bearing 35 (Figure 7). As shown, the hub engaging stepped collar 39 has an axially spaced collar 44 formed integral therewith to receive a plurality of diametrically opposed recesses 45 therein (Figure 8) for registry by a suitable spanner wrench (not shown) to tighten and loosen the hub engaging collar 39 relative to the gear blank 26.

Figure 5:
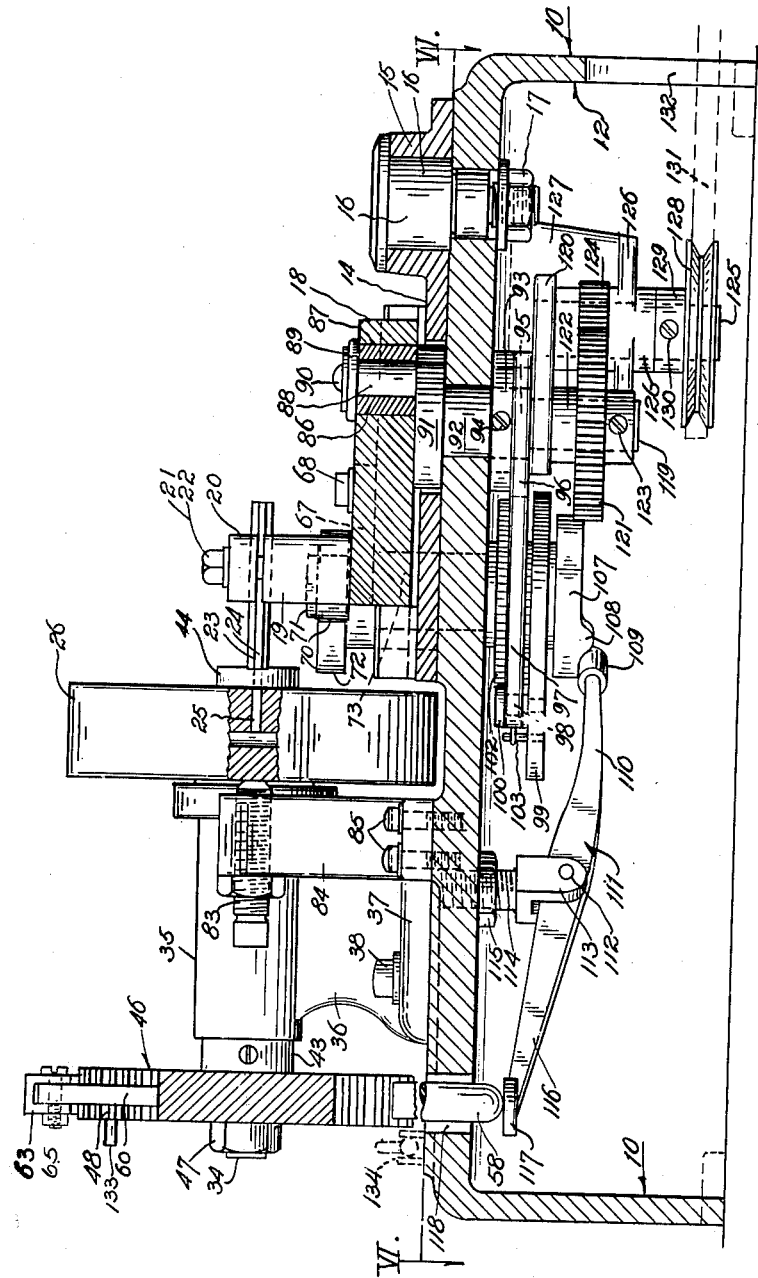
Figure 5 is a sectional view in elevation taken substantially along broken line V—V of Figure 1.

The tail stock shaft 34 carries an indexing gear 46 beyond the spacer collar 43 on the reduced extremity thereof for retention by a threaded nut 47 (Figures 5 and 7). The indexing gear 46 has its periphery provided with a plurality of teeth 48 corresponding in number with the teeth 25 to be cut in the internal gear blank 26, thereby cooperating with a rocker arm 49 mounted on a pin 50 carried by a bracket 51 (Figure 1). The bracket 51 is fixed to the frame bed 11 by fasteners 52, and a spring 53 is recessed in the frame bed 11 as at 54 (Figure 9) to normally urge the rocker arm 49 in a clockwise direction (viewed from Figure 9) to urge a pawl tooth 55 projecting transversely through the rocker arm 49 for retention therein by a set screw 56, in the direction of the indexing gear teeth 48 for registry therewith. This holds the indexing gear 46 and the tail stock shaft 34 in a fixed position during the cutting of a tooth 25. A set screw 57 extends through a portion of the rocker arm 49 to engage the mounting pin 50 to maintain the parts in assembled relation.

In order to shift the indexing gear 46 in a counterclockwise direction for the extent of a single tooth 48 responsive to the counterclockwise shifting of the rocker arm 49 by impact with a detent 58 that projects downwardly from the lower arm 59 of the rocker member 49, a curved link 60 is fixed to the upper extremity of the rocker arm 49 by means of a threaded fastener 61. A tooth engaging pawl 62 is carried by a bracket 63 that is adjustably attached to an elongated slot 64 in the bracket 63 by means of a threaded stud 65 anchored in the free extremity of the curved link 60. Consequently, as the pawl 55 disengages a gear tooth 48 by the counterclockwise movement of the rocker arm 49, the same movement causes the pawl 62 to engage an adjacent gear tooth 48 to shift the indexing gear 46 the distance of one tooth (Figure 8). At this moment another pawl 66 projecting through the lower arm 59 of rocker member 49, engages an adjacent tooth to preclude over-indexing. As the actuator for the rocker arm 49 recedes from the detent 58 in a manner to be hereafter described, the spring 53 again serves to displace the rocker arm 49 in the direction of the indexing gear 46, so that the pawl 55 will again engage the next succeeding tooth 48 for maintaining the gear blank 26 in the proper position during the cutting of the next tooth 25 therein, as will appear more fully hereinafter.

Figure 3:
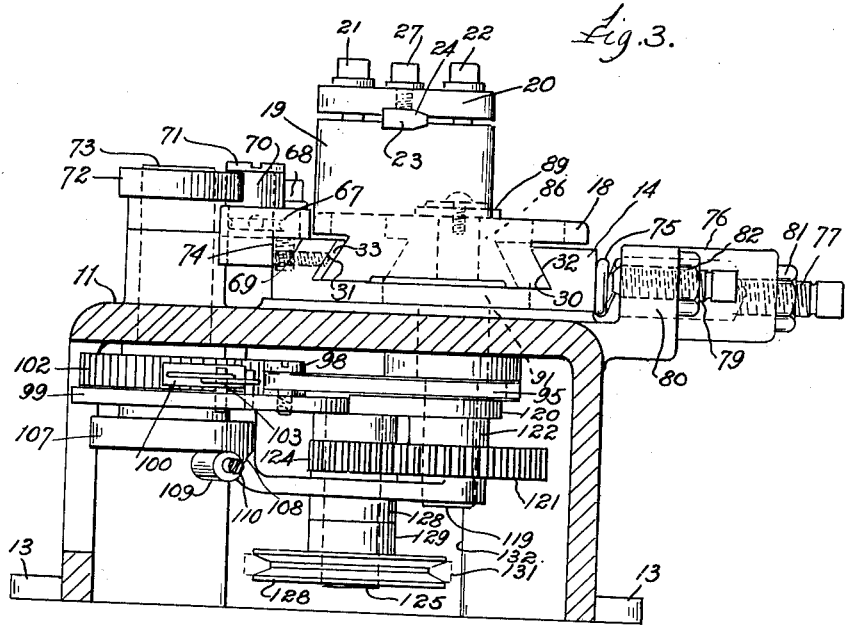
Figure 3 is a sectional view in elevation taken substantially along line III—III of Figure 1.

As shown, the ram guide 14 carries a lever 67 which is pivoted as at 68 to the top thereof adjacent an edge 69 to carry a roller 70 that is retained thereon by means of a vertical stud 71 (Figures 1 and 3) to maintain the roller 70 in the path of a cam 72 keyed or otherwise attached to a vertical shaft 73 comprising part of the operating instrumentalities (Figure 10) to be hereinafter described. The lever 67 has a straight edge 74 adjacent the ram side 14 (Figure 1) which abuts therewith for transversely displacing the ram 18 with its guide 14 against a compression spring 75 carried in a mount 76 fixed to the frame to carry an adjusting screw 77 that cooperates to position the spring 75 against the ram guide 14 on the side 78 opposite the ram guide side 69 and disposed parallel thereto. Another set screw 79 is mounted in an extension 80 of the spring mount 76 to serve as a limit stop for the maximum lateral displacement of the ram guide 14. Lock nuts 81—82 threadedly engage the set screws 77—79, respectively, to abut against the mount 76 and its extension 80 to maintain the set screws 77—79 in any adjusted position.

It will be observed that the clockwise intermittent rotation of the cam 72 successively displaces the ram guide 14 against the spring 75 (Figure 1) so that each individual step of displacement corresponds with the depth of the cut to be made with the cutter 23 during each reciprocation thereof relative to the internal gear blank 26 which is re-enforced in the path of the strokes made by the cutter 23, with a threaded stud 83 carried by a bracket 84 fixed to the frame bed 11 by fasteners 85. This will serve to preclude any vibration of the gear blank 26 and eliminate chattering of the tool cutter 23. The transverse displacement of the ram guide 14 and the reciprocation of the ram 18, are synchronously actuated by means of instrumentalities (Figures 1, 5, and 10) that include a thrust block 86 that transversely reciprocates in an elongated slot 87 provided in the ram 18. A pin 88 extends upwardly through the thrust block 86 for connection therewith through a top disc 89 having a fastener 90 extending therethrough for connection with the pin 88 (Figure 5).

Figure 6:
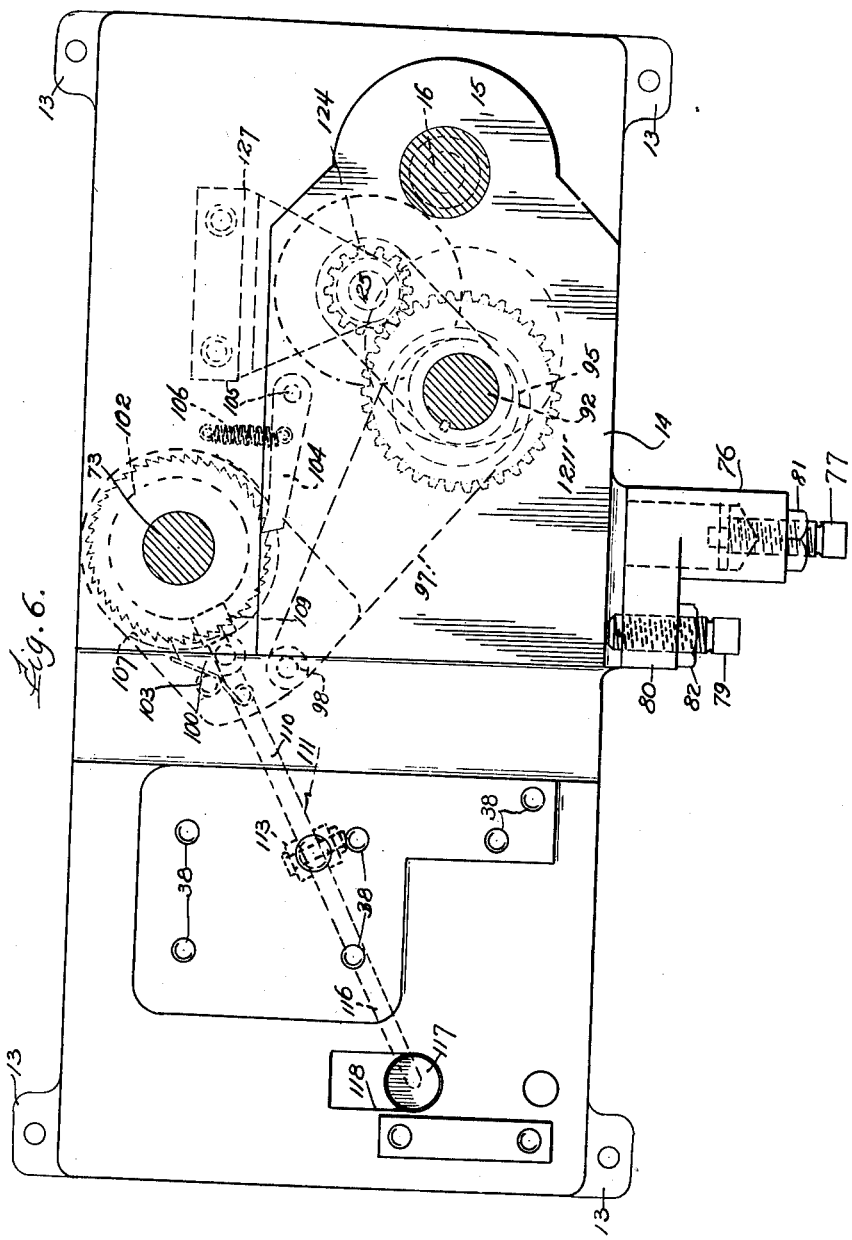
Figure 6 is a sectional plan view taken substantially along line VI—VI of Figure 5.

The pin 88 is anchored in a crank arm 91 fixed to a vertical shaft 92 journalled in the frame bed 11 to project within the chamber's interior 12 thereof. The shaft 92 carries a retainer collar 93 which is fixed thereto by a set screw 94. The shaft 92 has an eccentric 95 thereon beyond the collar 93 to engage the enlarged end boss of an elongated arm 97 which is pivoted as at 98 to a plate 99 which carries a pawl 100. The pawl 100 is pivoted as at 101 to the plate 99 for cooperation with the teeth of a ratchet wheel 102 fixed to the shaft 73 that is also journalled in the frame bed 11 to carry the cam 72 which receives its intermittent motion through the mechanism herein described in synchronous relation to the reciprocation of the thrust block 86. A spring 103 normally urges the pawl 100 in operative engagement with the ratchet wheel 102, and a locking pawl 104 is mounted as at 105 to also cooperate with the ratchet wheel 102 to preclude its idling rotation in a reverse direction (counterclockwise viewed from Figures 6 and 10). A spring 106 is anchored to the pawl 104 and the frame bed 11 to maintain the pawl 104 in frictional contact with the periphery of the ratchet wheel 102, thereby cooperating with the pawl 100 to precisely advance the ratchet wheel 102 in a clockwise direction for a predetermined step of one or more teeth as desired to correspondingly advance the cam 72.

The shaft 73 depends downwardly to carry a face cam 107 which has a lobe 108 on the periphery thereof to rotate in the path of a cam follower roller 109 journalled on the extremity 110 of a lever 111. The lever 111 is disposed for pivotal mounting on a pin 112 carried by a furcated bracket 113 which has a threaded shank 114 engaging a correspondingly threaded bore in the underside of the frame bed 11 (Figure 5). A lock nut 115 is provided on the threaded shank 114 to retain the latter in any adjusted position. The lever 111 has an upwardly extended arm 116 that terminates in a disc-shaped extremity 117 (Figures 5 and 9) that is disposed in the path of the depending detent 58 that projects downwardly through an opening 118 in the frame bed 11 to actuate the rocker member 49 in indexing the gear 46 for the extent of one tooth 48 as described above. This occurs after a full intermittent revolution of the shaft 73 which carries the cam 72 that laterally displaces the ram 18 which carries the tool cutter 23 therewith.

As a result, the gear blank 26 is indexed the distance of one tooth 25 after the preceding tooth has been fully cut and shaped in a series of successive lateral settings responsive to the intermittent rotation of the cam 72. The number of successive linear cuts effected with each forward stroke of the cutter tool 23 will necessarily vary with the shape, depth and material of the teeth 25 formed from the particular blank 26. The number of settings can be controlled by the cam 72, its shape and/or extent of rotation in each intermittent displacement thereof. The latter is a factor of the extent of throw imparted to the arm 97 by the eccentric 96; however, the average number of strokes or cuts per tooth may vary within a wide range depending upon the dictates of commercial practice. In the illustrated embodiment there are thirty-two cutting strokes per tooth. The first twenty strokes have a slightly angular feed-in of .006 inch each, the next six strokes each have .004 inch feed-in, and the final six strokes have no feed-in, but are in straight alignment with the axis of the blank 26.

The actuation of the eccentric 91 through the rotation of the shaft 92 which rotates the eccentric 95 that operates the indexing gear 46 and its associated elements in timed relation with the reciprocation of the ram 18, is powered from a single source of power. To this end, the shaft 92 has a depending extension 119 (Figures 5 and 10) of reduced diameter which carries a shaft spacer plate 120 against which a spur gear 121 with its axial hub 122 abuts. The spur gear hub 122 has a set screw 123 on its opposite side for attachment to the shaft 122 for rotation therewith. The spur gear 121 meshes with a pinion 124 fixed to a vertical stub shaft 125 which is journalled in a bearing 126 supported by a bracket 127 depending from and formed integral with the underside of the frame bed 11 (Figure 5).

The stub shaft 125 is also journalled in the shaft spacer plate 120 that is disposed above in spaced parallelism to the bracket bearing 126 to maintain the stub shaft in rigid parallel spaced relation with the shaft 92 and its axial extension 119. The stub shaft 125 carries a pulley 128 having an axial hub 129 through which a set screw 130 extends to hold the pulley 128 fast to the stub shaft 125. A suitable power transmitting belt 131 engages the periphery of the pulley 128 to project through an opening 132 in an end of the frame 10 for connection with a pulley on an electric motor (not shown) in the usual manner.

In order to de-energize the motor (not shown) and render inoperative the described instrumentalities after all the teeth 25 have been cut into the internal gear blank 26, a suitable trip 133 is provided on a side surface of the indexing gear 46 at a point spaced one-half tooth in advance of the initial tooth 48 or one-half tooth behind the last tooth 48 of the indexing gear 46 so that it will move in the path of a motor circuit breaking switch 134 of any suitable construction (Figure 9). This will stop the motor (not shown) and render all instrumentalities inactive, at which time an attendant changes the blank 26, and manually resets the switch 134 to again initiate the operation to repeat the cycles of operation for cutting teeth in the substituted internal blank as described supra.

It should be noted that the reciprocatory stroke of the cutter tool 23 requires minimum space and such will not be obstructed by the internal blank hub 29 and its mounting retainer disc 39—44 (Figure 7). This movement and type of cut for gear teeth 25 is especially adaptable to be useful in connection with the formation of internal gears. In fact, the teachings of the present invention find utmost usefulness in the cutting of internal gears, having integral hubs 29 or their counterpart; however, the teachings may be advantageously utilized in other situations and for other purposes.

While I have illustrated and described a preferred embodiment of this invention, it must be understood that the invention is capable of considerable variation and modification without departing from the spirit of the invention. I, therefore, do not wish to be limited to the precise details of construction set forth, but desire to avail myself of such variations and modifications as come within the scope of the appended claims.

I claim:

1. In a gear cutting machine or the like, the combination with a frame, of a ram guide pivotally associated with said frame for lateral displacement thereon, spring means for normally urging said ram guide in a lateral direction opposite to its intended displacement on said frame, a ram reciprocably mounted in said ram guide, a tool holder on said ram guide, blank supporting means on said frame, means for rotatively supporting a blank on said last named means, indexing means for rotatively indexing said blank supporting means in predetermined equidistant rotary positions, ratchet actuated cam means and direct actuated crank arm means for intermittently and alternately displacing said ram guide laterally and said ram longitudinally.

2. In a gear cutting machine or the like, the combination with a frame, of a ram guide movably associated with said frame for lateral displacement thereon, a ram reciprocably mounted in said ram guide, a tool holder on said ram guide, blank supporting means on said frame, means for rotatively supporting a blank on said last named means, indexing means for rotatively indexing said blank supporting means in predetermined equidistant rotary positions, power means on said frame, and means including ratchet actuated cam means and direct actuated eccentric means operatively connected to said power means for intermittently and alternately displacing said ram guide laterally and said ram longitudinally.

3. In a gear cutting machine or the like, the combination with a frame, of a ram guide movably associated with said frame for lateral displacement thereon, a ram reciprocably mounted in said ram guide, a tool holder on said ram guide, blank supporting means on said frame, means for rotatively supporting a blank on said last named means, indexing means for rotatively indexing said blank supporting means in predetermined equidistant rotary positions, power driven means on said frame, means including ratchet actuated cam means and direct actuated eccentric means operatively connected to said power driven means for intermittently and alternately displacing said ram guide laterally and said ram longitudinally, and means responsive to said last named means for actuating said indexing means after said ram and ram guide have been alternately displaced a predetermined number of times for cutting a tooth complement.

4. In a gear cutting apparatus, the combination with a frame, of a ram guide on said frame, a ram reciprocatively mounted in said guide, cam means mounted in the path of said ram guide to displace said guide and ram transversely of the reciprocative motion of the latter, power driven means on said frame, means operatively connected to said power driven means for intermittently rotating said cam means to alternately displace said ram guide and to reciprocate said ram along paths substantially normal to each other, a tool cutter mounted on said ram, gear blank supporting means on said frame in the path of said tool cutter, rotary indexing means associated with said gear blank supporting means, and means responsive to the predetermined displacement of said guide and ram to actuate said gear blank indexing means.

5. In a gear cutting apparatus, the combination with a frame, of a ram guide on said frame, a ram reciprocatively mounted in said guide, a thrust block mounted for transverse reciprocative movement in said ram, crank arm means operatively connected to said thrust block to intermittently reciprocate said ram in said ram guide, cam means mounted in the path of said guide to displace said guide and ram transversely of the reciprocative motion of the latter, means for intermittently rotating said cam means to alternately displace said ram guide and to reciprocate said ram along paths substantially normal to each other, a tool cutter mounted on said ram, gear blank supporting means on said frame in the path of said tool cutter, rotary indexing means associated with said gear blank supporting means, and means responsive to the predetermined displacement of said guide and ram to actuate said gear blank indexing means.

6. In a gear cutting apparatus, the combination with a frame, of a ram guide pivotally mounted on said frame, a ram reciprocatively mounted in said guide, a thrust block mounted for transverse reciprocative movement in said ram, crank arm means operatively connected to said thrust block to intermittently reciprocate said ram in said ram guide, cam means mounted in the path of said ram guide to pivotally displace said guide and ram transversely of the reciprocative motion of the latter, means for intermittently rotating said cam means to alternately displace said ram guide and to reciprocate said ram along paths substantially normal to each other, a tool cutter mounted on said ram, gear blank supporting means on said frame in the path of said tool cutter, rotary indexing means associated with said gear blank supporting means, and means responsive to the predetermined displacement of said guide and ram to actuate said gear blank indexing means.

7. In a gear cutting apparatus, the combination with a frame, of a ram guide on said frame, a ram reciprocatively mounted in said guide, a thrust block mounted for transverse reciprocative movement in said ram, crank arm means operatively connected to said thrust block to intermittently reciprocate said ram in said ram guide, cam means mounted in the path of said ram guide to displace said guide and ram transversely of the reciprocative motion of the latter, spring means for resisting the transverse displacement of said ram guide by said cam means, means for intermittently rotating said cam means to alternately displace said ram guide and to reciprocate said ram along paths substantially normal to each other, a tool cutter mounted on said ram, gear blank supporting means on said frame in the path of said tool cutter, rotary indexing means associated with said gear blank supporting means, and means responsive to the predetermined displacement of said guide and ram to actuate said gear blank indexing means.

8. In a gear cutting apparatus, the combination with a frame, of a ram guide on said frame, a ram reciprocatively mounted in said guide, a thrust block mounted for transverse reciprocative movement in said ram, crank arm means operatively connected to said thrust block to intermittently reciprocate said ram in said ram guide, cam means mounted in the path of said ram guide to displace said guide and ram transversely of the reciprocative motion of the latter, spring means for resisting the transverse displacement of said ram guide by said cam means, means for intermittently rotating said cam means to alternately displace said ram guide and to reciprocate said ram along paths substantially normal to each other, a tool cutter mounted on said ram, gear blank supporting means on said frame in the path of said tool cutter, rotary indexing means associated with said gear blank supporting means, means responsive to the predetermined displacement of said guide and ram to actuate said gear blank indexing means, means for operating all of the aforesaid means in synchronous timed relation whereby a gear tooth complement is reciprocatively cut in a blank responsive to a predetermined number of successive cutting strokes and the blank supporting means intermittently rotated in successive steps for cutting successive tooth complements uniformly around the entire blank periphery, and means for rendering said last named means inoperative after the last tooth complement has been cut adjacent the first tooth complement.

9. In a gear cutting apparatus, the combination with a frame, of a ram guide pivotally mounted on said frame, a ram reciprocatively mounted in said guide, a thrust block mounted for transverse reciprocative movement in said ram, crank arm means operatively connected to said thrust block to intermittently reciprocate said ram in said ram guide, cam means mounted in the path of said ram guide to pivotally displace said guide and ram transversely of the reciprocative motion of the latter, spring means for resisting the transverse displacement of said ram guide by said cam means, means for intermittently rotating said cam means to alternately displace said ram guide and to reciprocate said ram along paths substantially normal to each other, a tool cutter mounted on said ram, gear blank supporting means on said frame in the path of said tool cutter, rotary indexing means associated with said gear blank supporting means, and means responsive to the predetermined displacement of said guide and ram to actuate said gear blank indexing means.

10. In a gear cutting apparatus, the combination with a frame, of a ram guide pivotally mounted on said frame, a ram reciprocatively mounted in said guide, a thrust block mounted for transverse reciprocative movement in said ram, crank arm means operatively connected to said thrust block to intermittently reciprocate said ram in said ram guide, cam means mounted in the path of said ram guide to pivotally displace said guide and ram transversely of the reciprocative motion of the latter, spring means for resisting the transverse displacement of said ram guide by said cam means, means for intermittently rotating said cam means to alternately displace said ram guide and to reciprocate said ram along paths substantially normal to each other, a tool cutter mounted on said ram, gear blank supporting means on said frame in the path of said tool cutter, rotary indexing means associated with said gear blank supporting means, means responsive to the predetermined displacement of said guide and ram to actuate said gear blank indexing means, means for operating all of the aforesaid means in synchronized timed relation whereby a gear tooth complement is reciprocatively cut in a blank responsive to a predetermined number of successive cutting strokes and the blank supporting means intermittently rotated in successive steps for cutting successive tooth complements uniformly around the entire blank periphery, and means for rendering said last named means inoperative after the last tooth complement has been cut adjacent the first tooth complement.

11. In a gear cutting apparatus, the combination with a frame, of a ram guide on said frame, a ram reciprocatively mounted in said guide, cam means mounted in the path of said ram guide to displace said guide and ram transversely of the reciprocative motion of the latter, means for intermittently rotating said cam means to alternately displace said ram guide in one direction, direct actuated means to reciprocate said ram in another direction along a path substantially normal to said first named direction, a tool cutter mounted on said ram, gear blank supporting means on said frame in the path of said tool cutter, rotary indexing means including a toothed member and rocker arm mounted cooperating pawls, said indexing means being associated with said gear blank supporting means, and means responsive to the predetermined displacement of said guide and ram to actuate said gear blank indexing means.

ALFRED T. HUTCHINSON.

References Cited in the file of this patent

UNITED STATES PATENTS

| Number | Name | Date |
| --- | --- | --- |
| 1,047,926 | Eberhardt et al. | Dec. 24, 1912 |
| 1,266,839 | Maag | May 21, 1918 |
| 1,616,439 | Candee | Feb. 8, 1927 |
| 1,660,915 | Buckingham | Feb. 28, 1928 |
| 1,893,943 | Johanson | Jan. 10, 1933 |
| 2,125,873 | Aeberli | Aug. 9, 1938 |
| 2,148,072 | Johanson | Feb. 21, 1939 |
| 2,326,922 | Bieler | Aug. 17, 1943 |
| 2,547,832 | Newman | Apr. 3, 1951 |

FOREIGN PATENTS

| Number | Country | Date |
| --- | --- | --- |
| 181,437 | Great Britain | June 6, 1922 |
| 197,526 | Great Britain | May 17, 1923 |